United States Patent
Zhang et al.

(10) Patent No.: US 7,892,698 B2
(45) Date of Patent: *Feb. 22, 2011

(54) ELECTRICALLY CONDUCTIVE FUEL CELL CONTACT MATERIAL

(75) Inventors: Xinge Zhang, Calgary (CA); Anthony Wood, Calgary (CA); Michel Riou, Edmonton (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/516,596

(22) PCT Filed: Jul. 15, 2004

(86) PCT No.: PCT/CA2004/001044
§ 371 (c)(1),
(2), (4) Date: Sep. 5, 2006

(87) PCT Pub. No.: WO2005/008816
PCT Pub. Date: Jan. 27, 2005

(65) Prior Publication Data
US 2007/0003819 A1    Jan. 4, 2007

(51) Int. Cl.
*H01M 4/64* (2006.01)
(52) U.S. Cl. .................. 429/517; 429/519
(58) Field of Classification Search ............ 429/44, 429/45
See application file for complete search history.

(56) References Cited
U.S. PATENT DOCUMENTS
4,136,382 A    1/1979  Ricci
(Continued)

FOREIGN PATENT DOCUMENTS
DE    19627504 C1 * 10/1997

OTHER PUBLICATIONS

Larring, Yngve, et al. "Spinel and Perovskite Functional Layers Between Plansee Metallic Interconnect (Cr-5 wt % Fe-1 wt % Y2O3) and Ceramic (La0.85 Sr 0.15) 0.91 MnO3 Cathode Materials for Solid Oxide Fuel Cells" Journal of the Electrochemical Society 147, Oct. 1999.

*Primary Examiner*—Patrick Ryan
*Assistant Examiner*—Muhammad Siddiquee
(74) *Attorney, Agent, or Firm*—Bennett Jones LLP

(57) ABSTRACT

A multilayer contact approach for use in a planar solid oxide fuel cell stack includes at least 3 layers of an electrically conductive perovskite which has a coefficient of thermal expansion closely matching the fuel cell material. The perovskite material may comprise $La_{1-x}E_xCo_{0.6}Ni_{0.4}O_3$ where E is a alkaline earth metal and x is greater than or equal to zero. The middle layer is a stress relief layer which may fracture during thermal cycling to relieve stress, but remains conductive and prevents mechanical damage of more critical interfaces. A fuel cell stack is also disclosed, which comprises a plurality of planar interleaved fuel cells and interconnects comprising a contact layer disposed between at least one electrode of a fuel cell and an adjacent interconnect, the contact layer comprising a perovskite having the formula $ABO_3$ where: (a) A is a doped or undoped rare earth metal or lanthanide; (b) B is a doped or undoped transition metal; and (c) wherein the perovskite is a electrically conductive and has a coefficient of thermal expansion which closely matches that of the fuel cell.

14 Claims, 2 Drawing Sheets

U.S. PATENT DOCUMENTS

| | | |
|---|---|---|
| 4,276,202 A | 6/1981 | Schmidberger et al. |
| 4,546,301 A | 10/1985 | Tinebor et al. |
| 4,574,341 A | 3/1986 | Hellegaard et al. |
| 5,136,216 A | 8/1992 | Wills et al. |
| 5,146,147 A | 9/1992 | Wills et al. |
| 5,218,283 A | 6/1993 | Wills et al. |
| 5,315,497 A | 5/1994 | Severinsky |
| 5,339,348 A | 8/1994 | Wirth et al. |
| 5,406,185 A | 4/1995 | Strunk |
| 5,638,266 A | 6/1997 | Horie et al. |
| 5,933,344 A | 8/1999 | Mitsuishi et al. |
| 6,228,522 B1 | 5/2001 | Batawi et al. |
| 2002/0122971 A1* | 9/2002 | Ghosh et al. ............ 429/40 |
| 2004/0047789 A1* | 3/2004 | Tietz et al. ............ 423/263 |

* cited by examiner

ELECTRICALLY CONDUCTIVE FUEL CELL CONTACT MATERIAL

FIELD OF THE INVENTION

The present invention relates to a contact material in a solid oxide fuel cell comprising electrically conductive perovskites. Furthermore, the present invention relates to a multilayer design of contact materials which may include such perovskites.

BACKGROUND OF THE INVENTION

High temperature fuel cells like solid oxide fuel cells comprise an electrolyte sandwiched between a cathode and an anode. Oxygen combines with electrons at the cathode to form oxygen ions, which are conducted through the ion-conducting ceramic electrolyte to the anode. At the anode, oxygen ions combine with hydrogen and carbon monoxide to form water and carbon dioxide thereby liberating electrons.

The fuel cells are stacked and interleaved with interconnect plates which distribute gases to the electrode surfaces and which act as current collectors. Contact pastes are used to bond the electrode to an interconnect and must therefore be electrically conductive. In co-owned U.S. Pat. No. 6,420,064, a cathode contact layer comprised of lanthanum cobaltate is disclosed.

Lanthanum cobaltate ("LC") (also known as lanthanum cobaltite) is a perovskite material, which is a well-known class of mineral oxides characterized by a cubic or orthorhombic crystalline structure. Perovskites may be described by the formula $ABO_3$, where A represents divalent and/or trivalent ions and B represent trivalent and/or tetravalent ions, respectively, while the O atom is the oxygen ion. The divalent, trivalent and tetravalent ions may include $La^{3+}$, $Sm^{3+}$, $Sr^{2+}$, $Ca^{2+}$, $Co^{3+}$, $Ni^{3+}$, $Fe^{3+}$, $Cr^{3+}$, $Mn^{3+}$ or $Mn^{4+}$ amongst other known ions. In cubic perovskites, this $ABO_3$ structure in a general sense can be thought of as face centered cubic (FCC) lattice with A atoms at the corners and the O atoms on the faces. The B atom completes the picture and is located at the center of the lattice.

Some perovskites such as LC are reasonably good electrical conductors. However, as a contact paste in a Ni-YSZ anode-supported SOFCs, LC suffers from one significant disadvantage. If sintered, its coefficient of thermal expansion is significantly greater than that of the bulk cell. Consequently, thermal cycling of the fuel cell results in large thermal stresses and the contact paste may break away from the cell and interconnect resulting in poor electrical contact.

In some cases, contact paste materials which display better interface performance with the cell can have poor interface performance with the interconnect.

Therefore, there is a need in the art for fuel cells having an improved contact paste with a multilayer design which is electrically conductive and which mitigates the difficulties in the prior art.

SUMMARY OF THE INVENTION

The present invention provides for a contact material for use in fuel cell stack between a fuel cell electrode and an interconnect. The contact material is electrically conductive and porous to permit the flow of reactant to the electrode. In one embodiment, the electrode is a cathode.

In one aspect, the invention comprises a fuel cell stack comprising a plurality of planar interleaved fuel cells and interconnects comprising a contact layer disposed between at least one electrode of a fuel cell and an adjacent interconnect, the contact layer comprising a perovskite having the formula $ABO_3$ where:
(a) A is a doped or undoped rare earth metal or lanthanide;
(b) B is a doped or undoped transition metal; and
(c) wherein the perovskite is electrically conductive and has a coefficient of thermal expansion which closely matches that of the electrode or the interconnect, or both the electrode and the interconnect.

In one embodiment, the electrode is a cathode.

In another aspect, the invention comprises a fuel cell stack comprising a plurality of planar interleaved fuel cells and interconnects and comprising a contact layer disposed between at least one electrode of a fuel cell and an adjacent interconnect, the contact layer comprising at least two outer layers and a central layer of electrically conductive materials, wherein the central layer comprises a stress relief layer comprised of material selected from the group consisting of:
(a) particles of a conductive ceramic material which are coarser than particles of a conductive ceramic material in the outer layers;
(b) particles of a conductive ceramic material which have significantly different sintering characteristics than the outer layers; and
(c) a porous metallic material.

Preferably, the outer layers comprise fine particles while the central layer comprises coarse particles, as defined hereinbelow.

BRIEF DESCRIPTION OF THE DRAWINGS

The invention will now be described by way of an exemplary embodiment with reference to the accompanying simplified, diagrammatic, not-to-scale drawing where.

DETAILED DESCRIPTION OF THE INVENTION

The present invention provides for a perovskite contact material which may be used to interface between a solid oxide fuel cell electrode and an interconnect or a current collector. When describing the present invention, all terms not defined herein have their common art-recognized meanings. The following description is of a single embodiment and certain variations. It is not intended to be limiting of the invention as defined in the claims.

Figure 1:
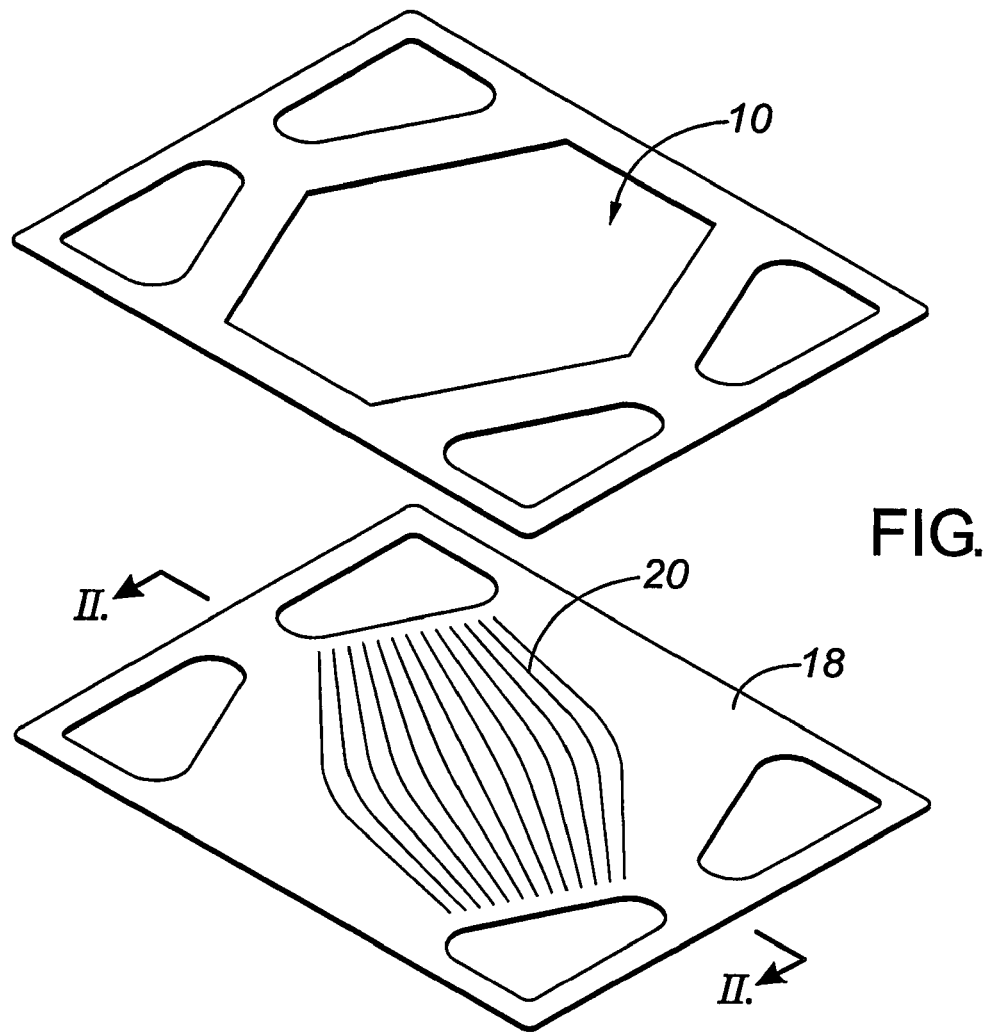
FIG. 1 is a perspective view of an embodiment of a fuel cell unit of the present invention.
Figure 2:
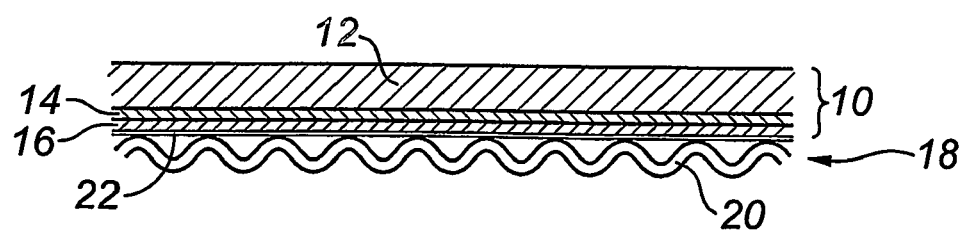
FIG. 2 is a cross-sectional view of an assembled fuel cell unit.

A portion of a fuel cell stack is illustrated as an exploded view in FIG. 1 and in cross-section in FIG. 2. A single fuel cell (10) consists of an anode (12) supported structure having a thin electrolyte (14) and cathode (16) layer. A single fuel cell unit also includes an interconnect (18) which may be a monolithic plate having flow-directing ribs (20) stamped as shown in FIG. 1. The ribs (20) assist in providing an even distribution of air flow across the entire surface of the cathode between the air intake and exhaust manifolds. The cathode may be composite material comprising a noble metal such as palladium and a ceramic such as yttrium stabilized zirconium, as described in co-owned U.S. Pat. No. 6,420,064, the contents of which are incorporated herein by reference.

The contact material (22) of the present invention is applied to one or both of the cathode and interconnect faces upon assembly of the fuel cell stack. The contact material may be applied by screen printing, as is well known in the art. In one embodiment, a layer may be screen printed onto the cathode surface and allowed to dry. The contact material paste dries as a porous green ceramic layer and may then be sintered prior to assembly of fuel cell units in the stack. Alternatively, the material may not be sintered before stack assembly, in which case, the contact material is sintered during operation of the fuel cell. A second contact layer is then applied (the fracture layer) and dried. Finally, a thin layer of the contact material as a wet paste is screen printed onto the cell dried layer(s) or the interconnect surface and the interconnect is then contacted with the cathode surface. If the interconnect is corrugated or ribbed, the contact material may or may not fill in the void areas of the interconnect. The contact material must be porous to allow reactants to flow from the interconnect and reach the fuel cell electrode.

Perovskites of the present invention may be described by the general formula $ABO_3$, where A is a doped or undoped rare earth metal, lanthanide or mixed lanthanide, and B is a doped or undoped transition metal, where the perovskite has a coefficient of thermal expansion which closely matches that of the fuel cell electrode or the interconnect. A coefficient of thermal expansion (CTE) is considered to closely match another CTE if it is within about $5 \times 10^{-6} K^{-1}$ of the other CTE. The coefficient of thermal expansion of a material may be determined empirically or by estimation using known and published values. Whether or not two materials have closely matched coefficients of expansion may also be determined experimentally by thermal cycling the two materials adhered to each other and observing the loss of adhesion. For example, a contact material of the present invention may be applied to an interconnect or to a fuel cell electrode, and the two materials thermally cycled within the operating temperature range of a solid oxide fuel cell. If no, or substantially none, loss of adhesion is observed, then a person skilled in the art may conclude that the CTE's of the two materials are likely to be closely matched.

The transition metal may comprise cobalt, nickel, iron, copper, zinc or lead. In one embodiment, B comprises cobalt doped with nickel as follows: $Co_{1-y}Ni_y$ where $0.3 \leq y \leq 0.7$. Preferably, y is about 0.4. Nickel is a preferred material because the inclusion of nickel in the B-site tends to lower the coefficient of thermal expansion. Further, the perovskite formed with nickel is highly electrically conductive but is not very reactive with other materials.

The A element is preferably lanthanum and may be doped with an alkaline earth metal such as strontium, barium or calcium to improve electrical conductivity. Therefore, A may comprise $La_{1-x}E_x$ wherein E is an alkaline earth metal and $0.0 \leq x \leq 0.8$. Lanthanum cobalt nickel oxide materials are referred to herein as "LCN".

A particularly preferred material is $La_{1-x}E_x Co_{0.6}Ni_{0.4}$ where x is greater than or equal to zero and less than about 0.7. Preferably, x is less than 0.5. The A and B elements may be stoichiometric or non-stoichiometric. If non-stoichiometric, the A:B ratio may vary from about 0.9 to about 1.1.

The perovskites of the present invention may be applied as a paste using well-known solvents and binders to either or both of the cathode and interconnect in a fuel cell unit and sintered prior to assembly of the fuel cell stack. Alternatively, the paste may be unsintered prior to assembly of the fuel cell stack and sintered in situ upon operation of the fuel cell stack. Stack operating temperatures may reach about 800° C. Sintering additives to lower the sintering temperature of the perovskite may be desirable or necessary. Suitable sintering additives or aids such as copper, silver or tin are well-known in the art.

A contact material of the present invention may also be used in the interface between the anode surface and an interconnect and its use is not restricted to the cathode surface.

Figure 3:
FIG. 3 is a SEM photograph of a multilayer contact material showing a fractured stress relief layer.

In one embodiment, as shown in FIG. 3, the contact paste material is applied in a multilayer configuration which may provide better resistance to thermal cycling degradation and long term degradation. In one embodiment, the contact paste is applied in three layers in which the outer contact layers (100, 102) adhere to the fuel cell electrode and interconnect respectively, and the central layer comprises a stress relief layer (104). In one embodiment, the outer contact layers comprise fine conductive particles while the stress relief layer comprises coarse conductive particles. The conductive particles in either or both the fine and coarse layers preferably comprise conductive perovskites, including those perovskites described herein, or perovskites having a $K_2NiF_4$-type structure (e.g. $La_2Ni_{1-x}Co_xO_4$) or any other electrically conducting ceramic powder compatible with the fuel cell electrolyte and electrode materials.

As used herein, the term "fine" particles comprise particles having diameters less than about 2 μm and preferably about 0.3 to about 1.1 μm. As used herein, "coarse" particles comprises particles which are at least twice as large than fine particles. Preferably, coarse particles have diameters greater than about 1 μm and more preferably greater than about 2 μm.

The stress relief layer (104) may be formed of a conductive ceramic material, such as the perovskites described herein, which has similar chemistry and similar sintering characteristics to the fine outer layers but comprises coarse particles. Alternatively, the stress relief layer may be formed from a conductive ceramic material which has significantly different sintering characteristics than the fine layers. For example, the stress relief layer may be formed of lanthanum strontium manganite (LSM), which has a significantly higher sintering temperature than LC or LCN. In this case, the stress relief particle size may be fine or coarse. In this case, the stress relief layer would not sinter or sinter to the same extent as the other layers. Alternatively, the stress relief layer may be formed of a porous metallic material such as expanded metal, or a fine metal mesh.

The stress relief layer may be porous or highly porous. In one embodiment, the stress relief layer comprises coarse particles and has a porosity of between about 25% to about 70%. Preferably, the stress relief layer may be about 50% porous. Porous metallic stress relief layers may be more porous, up to about 95%.

The fine particle layers (100, 102) may be thinner or thicker than the coarse central layer. Preferably, the fine particle layers are less than about 25 μm thick while the coarse central layer may be about 10 μm to about 50 μm thick. The combined thickness of the multilayer contact materials may be about 60 to 120 μm, depending on the stack design and seal thicknesses. The combined thickness should preferably not exceed 200 μm.

The layers may be applied by screen printing a paste and sintered prior to stack assembly or left unsintered as described above. Sintering aids may be included if necessary or desired. The necessity or desirability of a sintering aid may be determined empirically by one skilled in the art.

In one specific embodiment, a layer of fine lanthanum cobalt nickel oxide (LCN), as described above, is applied to the fuel cell electrode surface by screen printing. The LCN particles have an average particle size of about 1.0 μm with about 50% of the particles falling in the range of about 0.5 μm to about 1.1 µm. This layer of fine LCN particles is less than about 25 µm thick and may or may not be sintered. Subsequently, a layer of coarse LCN material, as described above, is applied by screen printing onto the first fine layer and allowed to dry. The coarse LCN particles have an average particle size of between about 2 to about 3 µm, with a majority of the particles falling in the range between about 1 µm to about 10 µm. The remaining fine layer of LCN is screen printed onto this layer on the cell or the interconnect just prior to assembly of the stack. In an alternative embodiment, LC may be used in place of LCN in any or all of the layers.

The multilayered approach may provide better long term stability by providing a sacrificial fracture layer which may absorb expansion mismatches during thermal cycling and long term operation. The interfaces between the fine layers and the fuel cell and interconnect respectively remain intact while physical stresses are absorbed by the central stress relief layer. As shown in FIG. 3, a scanning electron micrograph demonstrates such a fracture in an autopsied fuel cell. The inventors have found that electrical conductivity through the contact material is maintained while the layers are compressed in a stack despite such horizontal fractures in the stress relief layer.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A fuel cell stack comprising a plurality of planar interleaved fuel cells and interconnects and comprising a contact layer disposed between at least one electrode of a fuel cell and an adjacent interconnect, the contact layer comprising at least two outer layers and a central layer of electrically conductive materials having the central layer disposed between the two outer layers, wherein the central layer comprises a stress relief layer comprised of particles of a conductive ceramic material which are coarser than in the outer layers.

2. The fuel cell stack of claim 1 wherein the coarse particles have an average diameter at least about twice as large as the average diameter of the fine particles.

3. The fuel cell stack of claim 2 wherein the outer layers comprises particles having an average diameter of less than about 2 µm and the central layer comprises particles having a diameter of greater than about 2 µm.

4. The fuel cell stack of claim 1 wherein the central layer comprises lanthanum cobalt nickel oxide particles.

5. The fuel cell stack of claim 4 wherein the outer layers comprise lanthanum cobaltate particles.

6. The fuel cell stack of claim 1 wherein the outer layers comprise fine lanthanum cobaltate or lanthanum cobalt nickel oxide particles and the stress relief layer comprises fine lanthanum strontium manganite particles, or coarse lanthanum strontium manganite particles, or coarse lanthanum cobalt nickel oxide particles.

7. The fuel cell stack of claim 6 wherein a first outer layer contacting the electrode comprises fine lanthanum cobalt nickel oxide particles, a second outer layer contacting the interconnect comprises fine lanthanum cobaltate particles, and the stress relief layer comprises coarse lanthanum cobalt nickel oxide particles.

8. The fuel cell stack of claim 1 wherein any layer of the contact layer comprises a perovskite having the formula $ABO_3$ where:
   (a) A is a doped or undoped rare earth metal or lanthanide;
   (b) B is a doped or undoped transition metal; and
   (c) wherein the perovskite is electrically conductive and has a coefficient of thermal expansion which closely matches that of the fuel cell.

9. The fuel cell stack of claim 8 wherein A comprises doped or undoped lanthanum.

10. The fuel cell stack of claim 9 wherein B comprises cobalt combined with nickel as follows: $Co_{1-y}Ni_y$ where $0.3 \leq y \leq 0.7$.

11. The fuel cell stack of claim 10 wherein the perovskite material comprises $La_{1-x}E_xCo_{0.6}Ni_{0.4}O_3$, where E is an alkaline earth metal and x is greater than or equal to zero.

12. The fuel cell stack of claim 8, 9, 10 or 11 wherein at least one dopant is a sintering aid.

13. The fuel cell stack of claim 8 wherein the electrode comprises a noble metal and yttria stabilized zirconia.

14. The fuel cell stack of claim 13 wherein the noble metal comprises palladium.

* * * * *